No. 668,228. Patented Feb. 19, 1901.
C. H. SMITH.
APPARATUS FOR MECHANICALLY DRAWING OUTLINES OF THE HUMAN FIGURE.
(Application filed Oct. 10, 1899.)
(No Model.) 6 Sheets—Sheet 1.
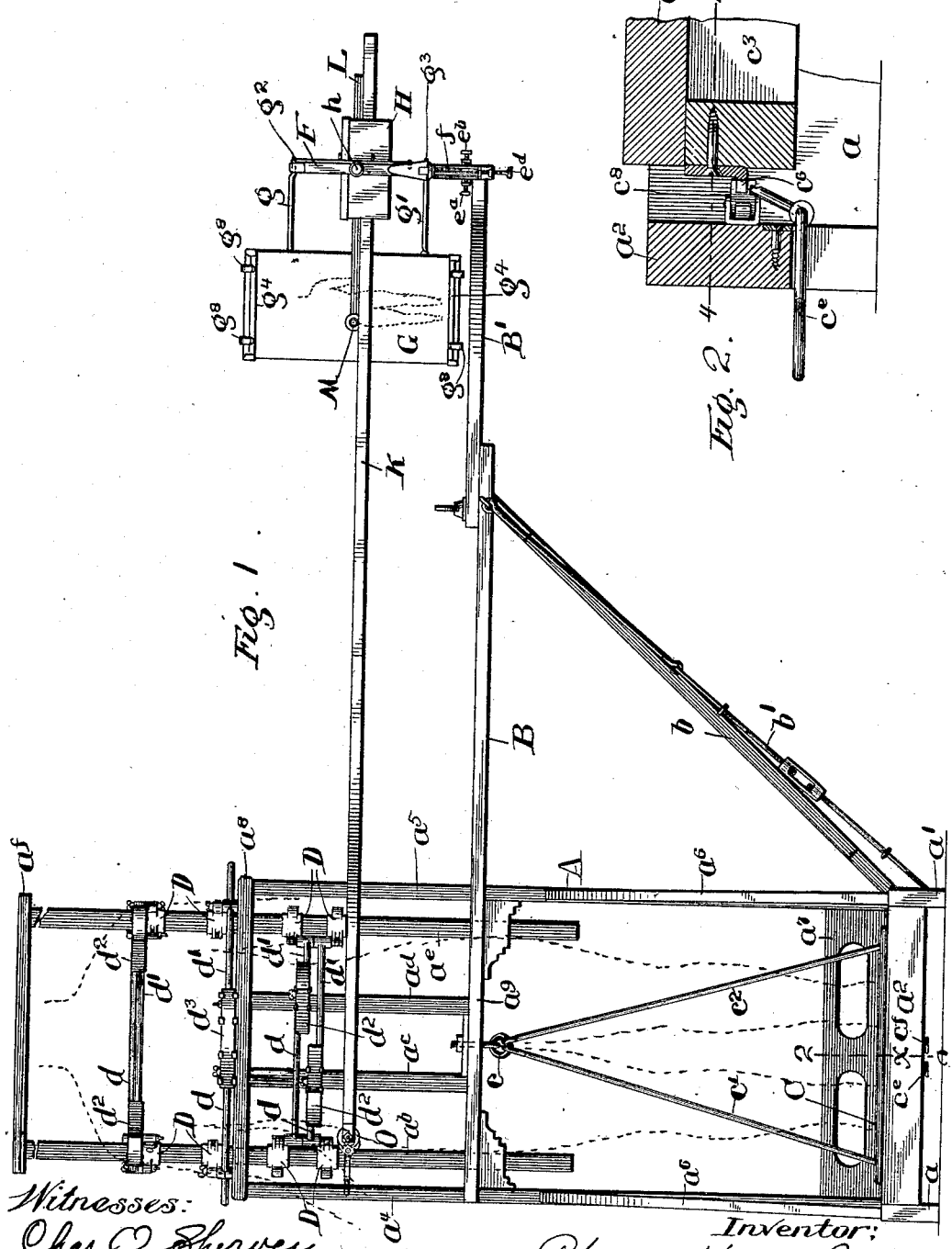

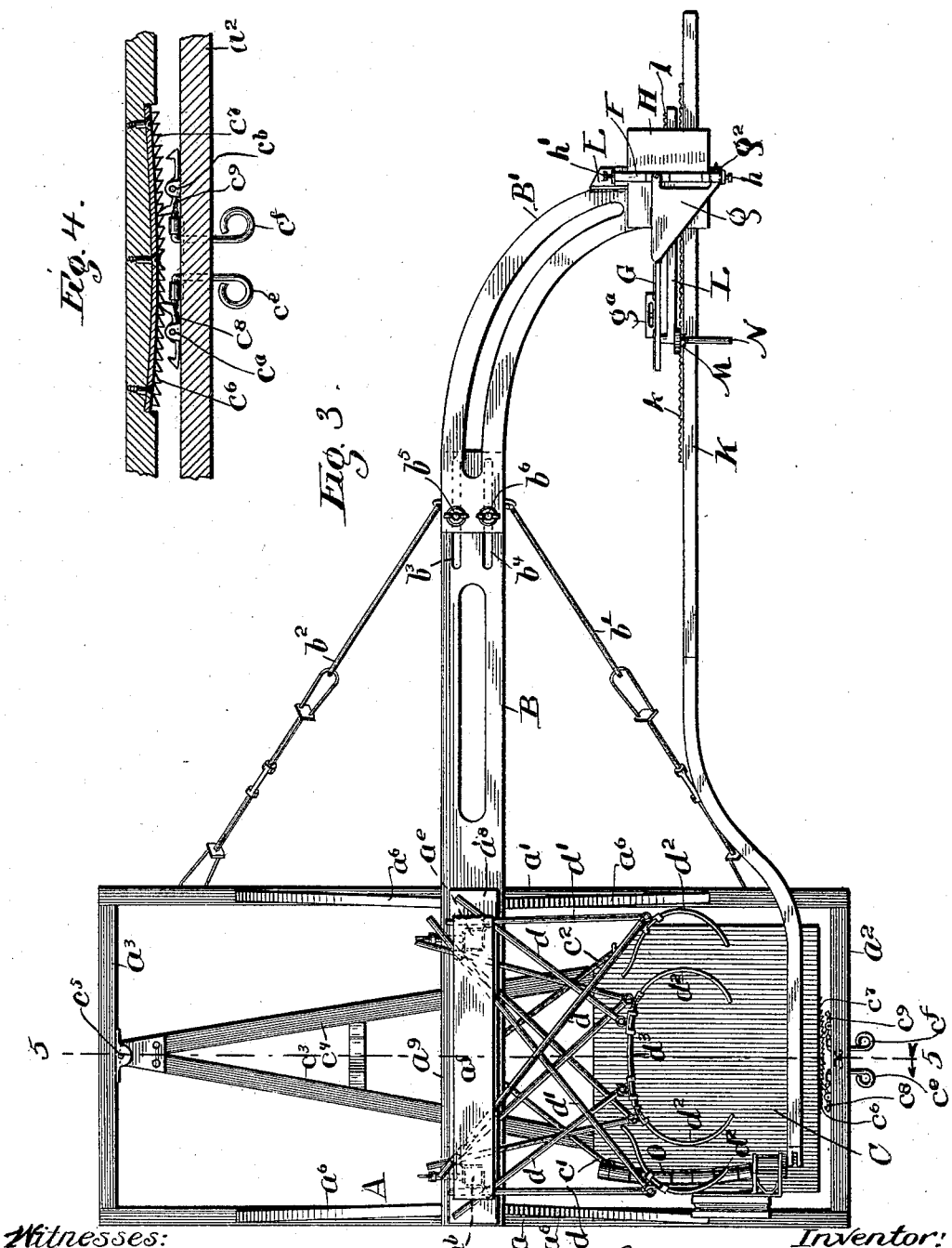

No. 668,228. Patented Feb. 19, 1901.
C. H. SMITH.
APPARATUS FOR MECHANICALLY DRAWING OUTLINES OF THE HUMAN FIGURE.
(Application filed Oct. 10, 1899.)
(No Model.) 6 Sheets—Sheet 3.
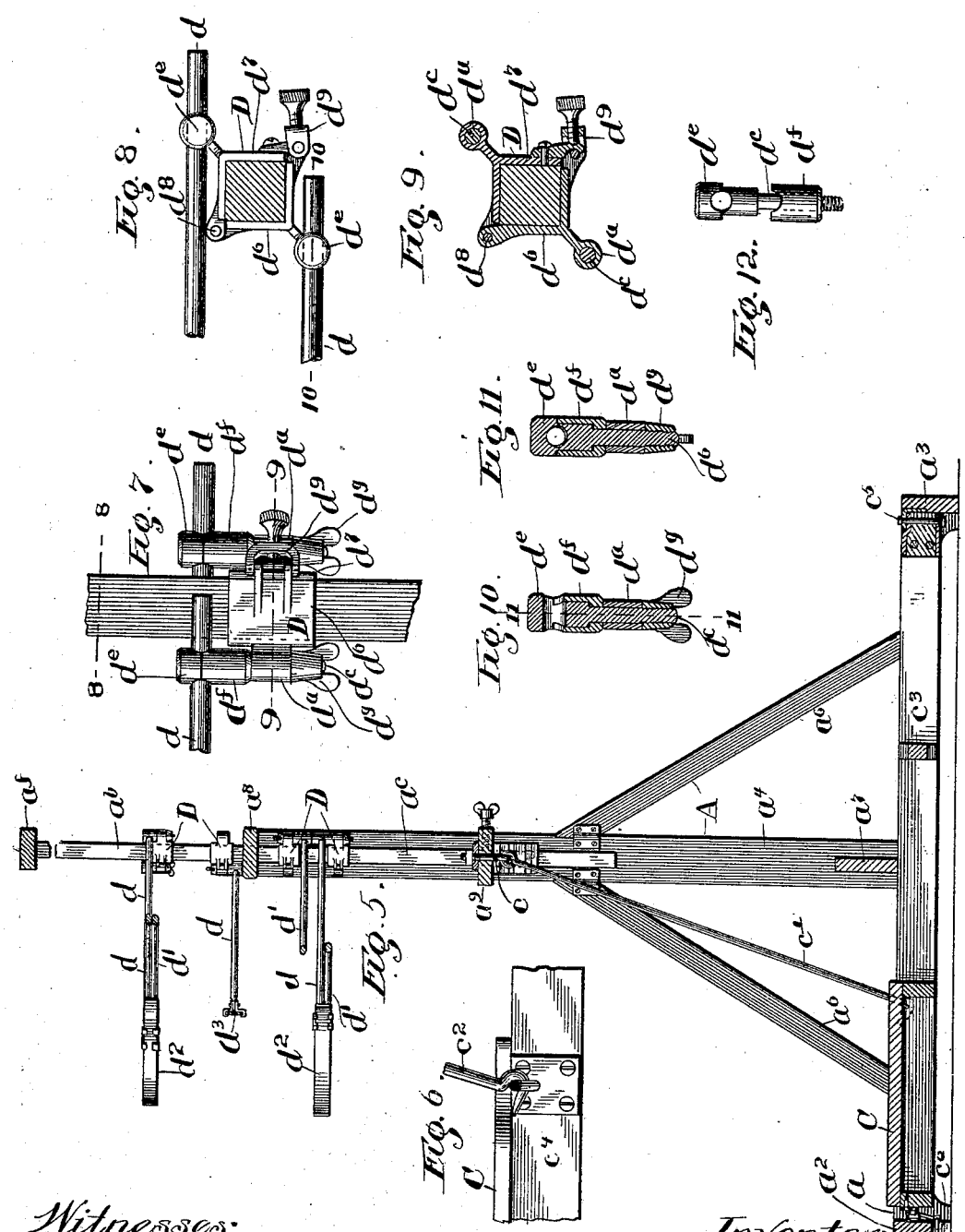

No. 668,228. Patented Feb. 19, 1901.
C. H. SMITH.
APPARATUS FOR MECHANICALLY DRAWING OUTLINES OF THE HUMAN FIGURE.
(Application filed Oct. 10, 1899.)
(No Model.)
6 Sheets—Sheet 4.
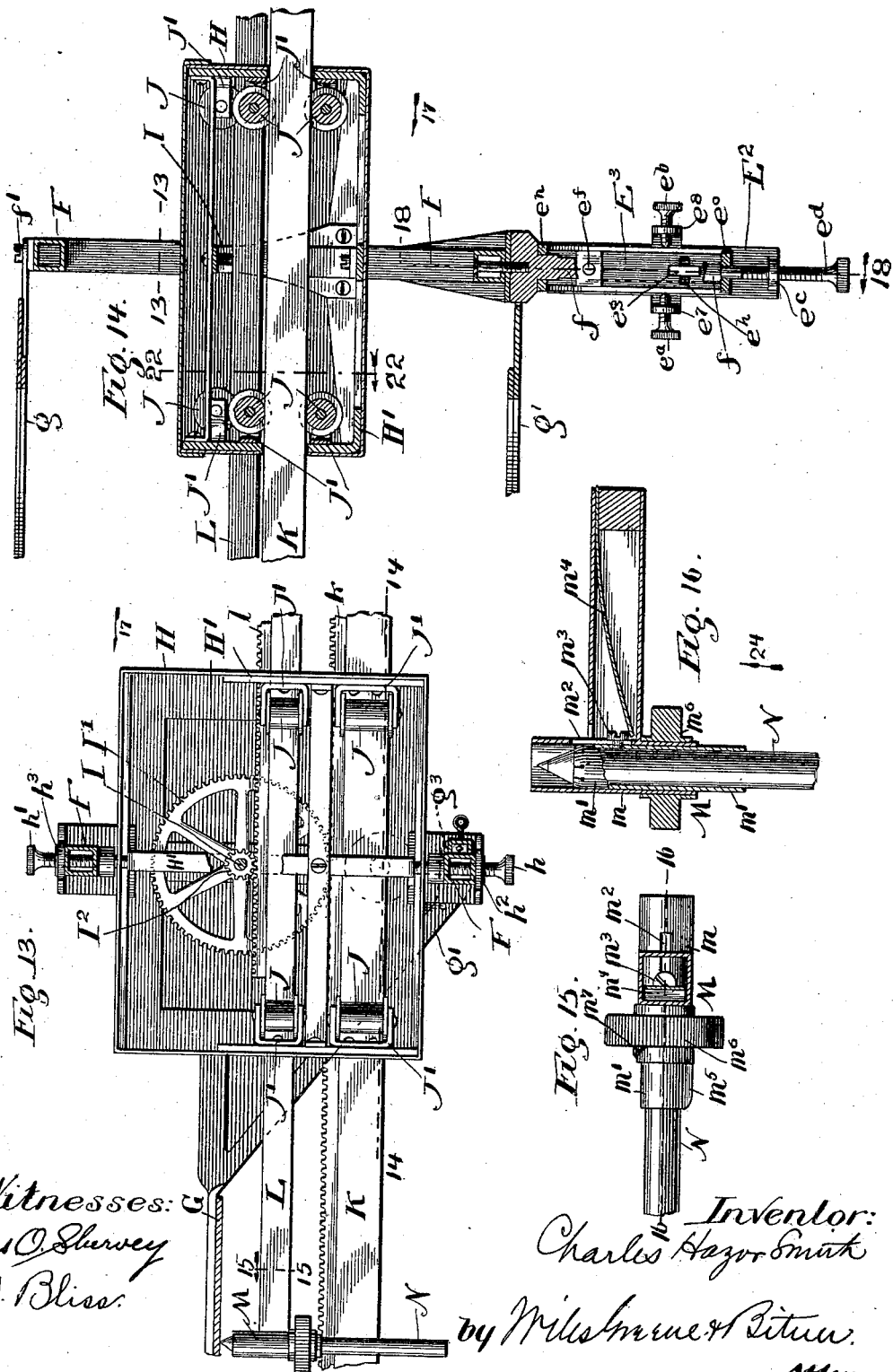

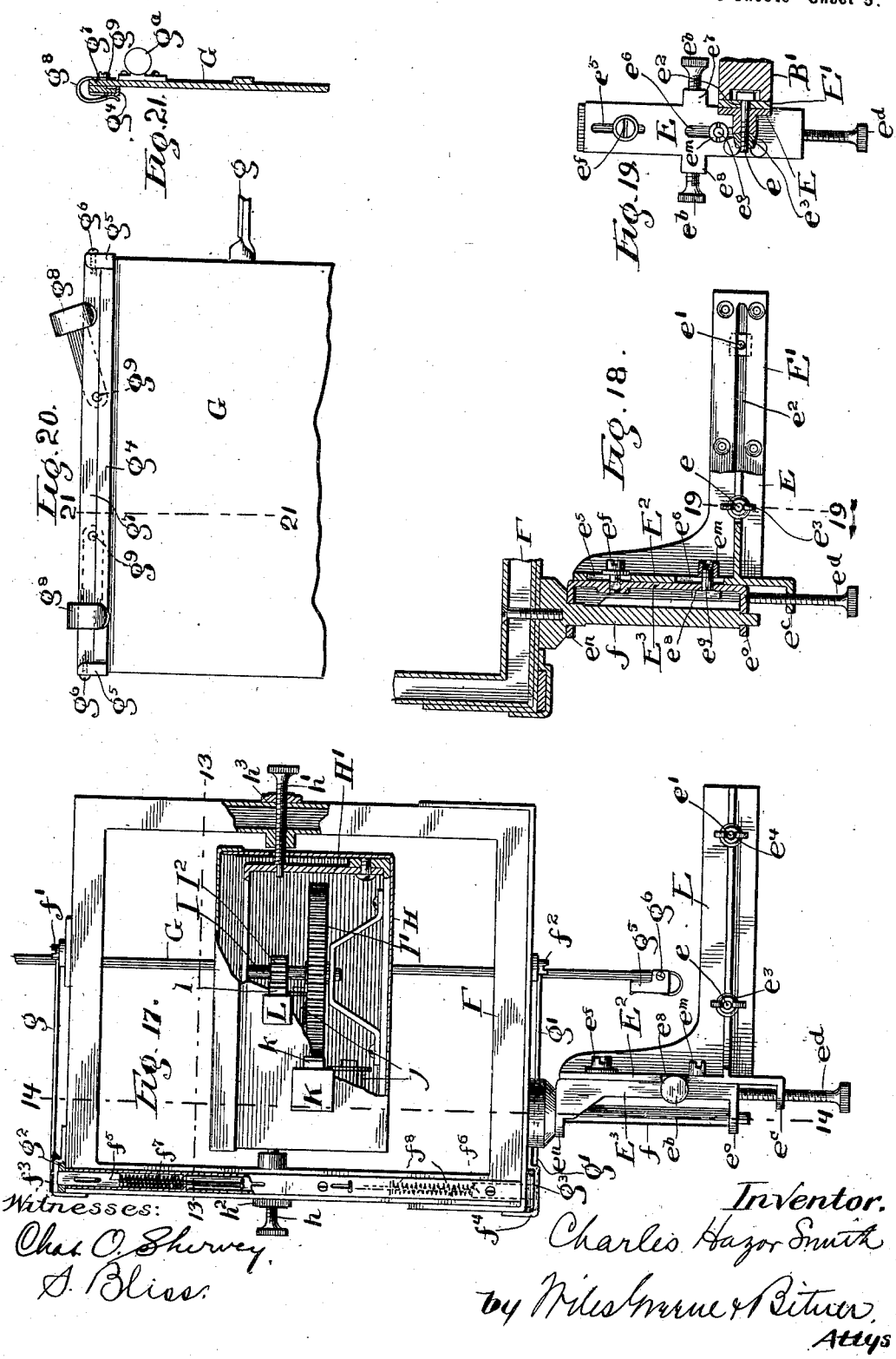

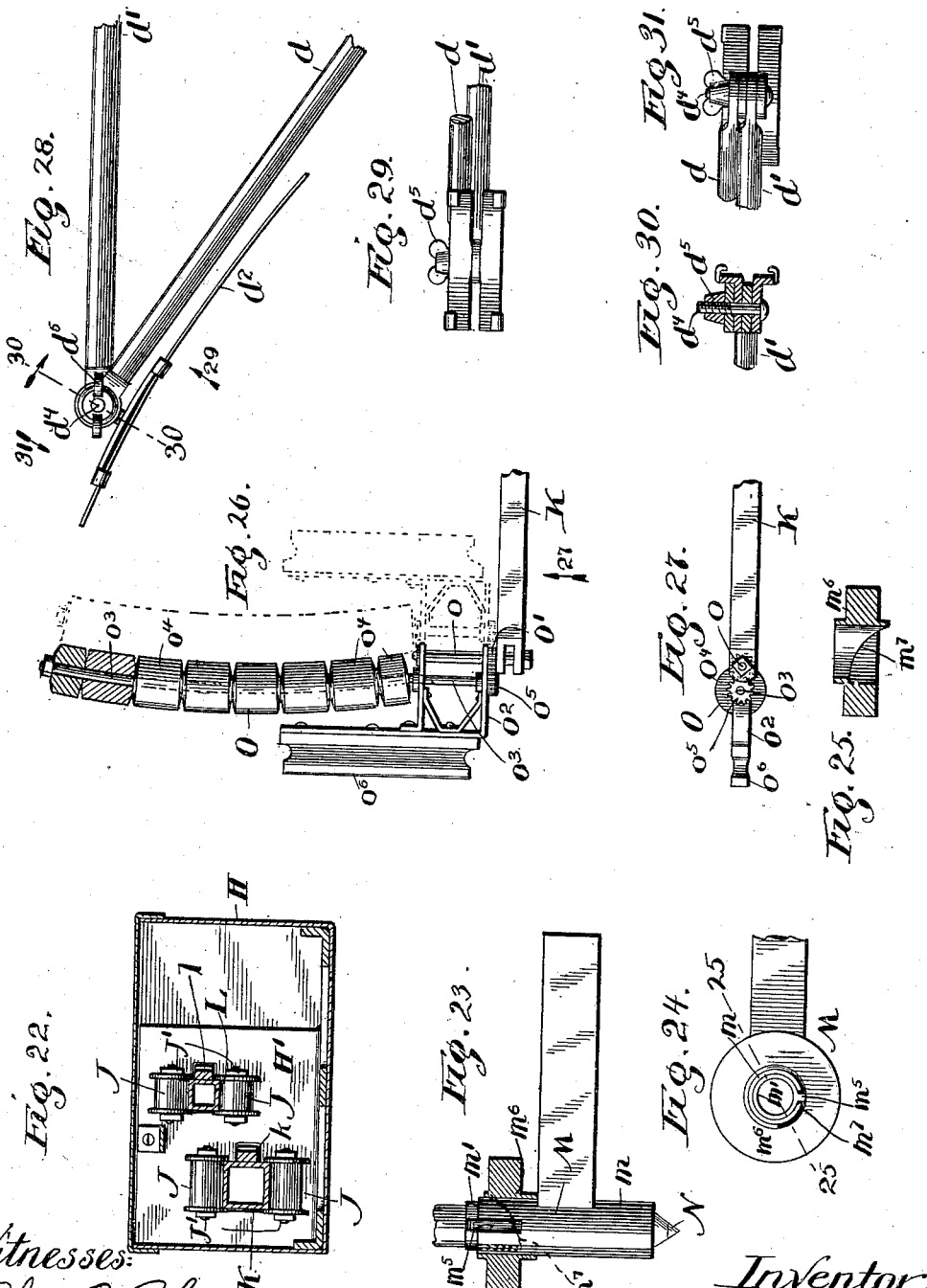

UNITED STATES PATENT OFFICE.

CHARLES HAZOR SMITH, OF CHICAGO, ILLINOIS.

APPARATUS FOR MECHANICALLY DRAWING OUTLINES OF THE HUMAN FIGURE.

SPECIFICATION forming part of Letters Patent No. 668,228, dated February 19, 1901.

Application filed October 10, 1899. Serial No. 733,132. (No model.)

*To all whom it may concern:*

Be it known that I, CHARLES HAZOR SMITH, a citizen of the United States of America, residing at 1323 Lill avenue, Chicago, in the county of Cook and State of Illinois, have invented certain new and useful Improvements in Apparatus for Drawing Mechanically and Preferably on a Reduced Scale the Outlines of the Human Figure, of which the following is a specification.

My invention relates to certain apparatus for drawing mechanically and preferably on a reduced scale the outlines of the human figure.

The object of the invention is to enable said outlines to be transferred and preferably reduced mechanically and directly from the figure itself and to arrange the same in such relation to a given line or lines as to indicate the pose of the figure from which they are taken.

To such end the invention consists in a certain new and improved apparatus provided with means for automatically bringing the vertical line through the center of gravity of the object placed upon the apparatus into a fixed vertical plane in the apparatus.

The invention also consists in a certain traveler adapted to pass over the surface of the body, certain reducing-gearing combined therewith, and certain marking devices geared to the traveler to move proportionately therewith and in that manner to follow all of the movements of the traveler.

It also consists in certain devices for supporting and adjusting a suitable surface to receive the outlines of the figure.

It also consists in certain adjustable rests adapted to support and steady the body when once brought into position.

It further consists in other novel features of form, arrangement, and construction, all of which will fully appear from the description herein and the essential features of which will be pointed out in the claims.

In the drawings, Figure 1 is a front elevation of the apparatus in its preferred form. Fig. 2 is a detail cross-section of a pawl-and-ratchet mechanism used in retarding the movement of the platform to the center of gravity, the line of section being indicated at 2 2 in Fig. 1. Fig. 3 is a plan view. Fig. 4 is a detail horizontal section in line 4 4 of Fig. 2. Fig. 5 is a vertical cross-section in line 5 5 of Fig. 3 looking in the direction of the arrow 5. Fig. 6 is a detail side elevation of a portion of the platform, showing a portion of one of its supporting-rods. Fig. 7 is a detail side elevation of one of the clamps for supporting certain of the rests which retain the person in place upon the platform. Fig. 8 is a plan view of the same with the supporting-rod in horizontal section, the line of section being indicated in line 8 8 of Fig. 7. Fig. 9 is a detail horizontal section in line 9 9 of Fig. 7. Fig. 10 is a detail vertical section in line 10 10 of Fig. 8. Fig. 11 is a detail vertical cross-section in line 11 11 of Fig. 10. Fig. 12 is a side elevation of a portion of one of the rest-clamps. Fig. 13 is a plan view of certain reducing-gearing used in the machine, with its supporting-frame in horizontal section, the line of section being indicated in line 13 13 in Figs. 14 and 17. Fig. 14 is a vertical longitudinal section in line 14 14 of Figs. 13 and 17. Fig. 15 is a detail cross-section in line 15 15 of Fig. 13. Fig. 16 is a detail horizontal section in line 16 16 of Fig. 15. Fig. 17 is an end view of the parts shown in Figs. 13 and 14 looking in the direction of the arrow 17 of said figures, with certain parts broken away to illustrate other important portions. Fig. 18 is a vertical cross-section in line 18 18 of Fig. 14. Fig. 19 is a vertical section in line 19 19 of Fig. 18. Fig. 20 is a detail front elevation of the upper portion of the chart-holder. Fig. 21 is a vertical cross-section in line 21 21 of Fig. 20. Fig. 22 is a vertical cross-section in line 22 22 of Fig. 14. Fig. 23 is a detail plan view of the pencil-holder, with a certain nut in horizontal section. Fig. 24 is an end view looking in the direction of the arrow 24 in Fig. 16. Fig. 25 is a detail cross-section of an adjusting-nut in line 25 25 of Fig. 24. Fig. 26 is a detail plan view of the traveler. Fig. 27 is a front elevation thereof looking in the direction of the arrow 27 in Fig. 26. Fig. 28 is a plan view of a portion of one of the rests and its supporting-rods. Fig. 29 is a front elevation thereof looking in the direction of the arrow 29 in Fig. 28. Fig. 30 is a vertical cross-section in line 30 30 of Fig. 28, and Fig. 31 is a rear elevation looking in the direction of the arrow 31 in Fig. 28.

Referring to the drawings, A is a framework made up of a rectangular base consisting of longitudinal side pieces $a$ $a'$ and end pieces $a^2$ $a^3$. Supported upon this base are two standards $a^4$ $a^5$, provided with diagonal braces $a^6$ and connected together by three horizontal cross-pieces, one at the bottom $a^7$, one at the top $a^8$, and an intermediate cross-piece $a^9$, extending beyond the upright upon one side in the form of a laterally-extending arm B, supported from the base by means of a diagonal strut $b$ and oblique tie-rods $b'$ $b^2$. From the middle of the cross-piece $a^9$ is supported an eye $c$, in which is pivoted the upper ends of two downwardly-diverging rods $c'$ $c^2$, suspending a platform C, resting upon two rearwardly-converging bars $c^3$ $c^4$, united at their rear ends and vertically pivoted to the base at $c^5$. The platform swings from the eye $c$ and automatically brings the center of gravity of any object resting upon it into the vertical plane passing through the eye and the vertical pivot at the rear end of the platform-bars $c^3$ $c^4$. The front edge of the platform is provided with two series of ratchet-teeth $c^6$ $c^7$, facing in opposite directions, (see Fig. 4,) and escapement-pawls $c^8$ $c^9$ are pivoted to the base at $c^a$ $c^b$ and operated by means of vertically-oscillating handles $c^e$ $c^f$, projecting from the forward end of the base. The purpose of these escapements is to prevent the too-rapid swinging of the platform, which would be likely to upset the person standing upon the same. When the person to be measured takes his place upon the platform, the latter tends to swing to one side or the other, depending upon the position of said person. This tendency is checked by the pawl and co-operating series of ratchet-teeth which happen to be facing in the right direction, and oscillation of the platform is possible only in a step-by-step manner, as in the ordinary escapement devices. The rocking of the escapement-pawl is effected by one of the forwardly-projecting handles $c^e$ $c^f$, both of which are horizontally pivoted to the frame and have upwardly-extending arms, as shown in Fig. 2, pivoted at their upper ends to the respective pawls. The front cross-piece $a^2$ of the base is marked at $x$ to show where the vertical plane of the center of gravity thus positioned cuts the cross-piece. The purpose of this mark will appear later. In the upper two cross-pieces of the frame are secured vertical bars $a^b$ $a^c$ $a^d$ $a^e$, of which $a^b$ $a^e$ extend upward above the cross-piece $a^8$ and are themselves united at the top by means of a cross-bar $a^f$. Upon these vertical bars are secured a series of clamps D, carrying horizontal rods $d$ $d'$, united at their forward ends by means of an adjustable bearing plate or rest $d^2$ $d^3$, which is preferably secured to the ends of the rods by means of set-screws $d^4$ and thumb-nuts $d^5$. (See Figs. 28 to 31, inclusive.) The two rods, which are secured to each of the rests, diverge as they extend therefrom sufficiently to give the rest horizontal rigidity in any direction, and the supporting-rods are adjustable both longitudinally and pivotally in the clamps, so as to give to the rest universal horizontal adjustment. The rests $d^2$ are both side and back rests and are horizontally pivoted to the supporting-rods. The rest $d^3$ is a back-rest only and is separately pivoted to the two rods which support it. The construction of the clamps by means of which the supporting-rods are secured to the frame is shown in Figs. 7 to 12, inclusive. Two angle-plates $d^6$ $d^7$ are hinged together at $d^8$ and provided upon the opposite side with a latch $d^9$. Projecting from the angles of the plates are ears $d^a$ $d^a$, in which are secured bolts $d^c$, provided with perforated heads $d^e$, surrounding collars $d^f$, notched to correspond with the perforations, and clamping-nuts $d^g$ to draw the heads into the collars and clamp the supporting-rods in the perforations.

The laterally-projecting arm B is slotted at $b^3$ $b^4$, and a curved extension B', secured thereto by means of bolts $b^5$ $b^6$ passing through the slots, making the extension longitudinally adjustable upon the arm. Upon the end of the curved extension is secured a base-plate E', (see Figs. 17, 18, and 19,) upon which is secured a longitudinally-adjustable supporting-plate E, secured by means of bolts $e$ $e'$ passing through a slot $e^2$ in the base-plate and provided with wing-nuts $e^3$ $e^4$. The supporting-plate has a vertical end plate $E^2$, provided with two vertical slots $e^5$ $e^6$ and with two laterally-projecting and forwardly-extending ears $e^7$ $e^8$, in which are threaded set-screws $e^a$ $e^b$. The lower end of the vertical plate is also provided with a forwardly-projecting ear $e^c$, in which is threaded an adjusting-screw $e^d$.

A vertically-adjustable oscillating plate $E^3$ is secured to the end plate by means of a screw $e^f$, threaded in the upper portion of the oscillating plate and extending through the slot $e^5$ in the end plate. This screw acts as a pivot upon which the oscillating plate may swing and is capable of vertical adjustment in the slot $e^5$. The oscillating plate contains an arc-shaped slot $e^h$, (see also Fig. 14,) and a bolt $e^g$ extends through this slot and the slot $e^6$ of the end plate and is provided beyond the latter with a nut $E^m$. This bolt may move vertically in the slot in the end plate and laterally in the arc-shaped slot in the oscillating plate, so that it permits both the vertical adjustment of the plate and the pivotal or oscillating adjustment of the same upon the screw $e^f$. The set-screws $e^a$ $e^b$ at the side clamp the oscillating plate in its pivotal adjustment and the set-screw $e^d$ supports it in its vertical adjustment. These screws also provide means of making a close and accurate adjustment, as the oscillating plate may be moved in the various directions by turning the screws. When the adjustment has been finally completed, the oscillating plate may be securely clamped in position by drawing up the screw $e^f$ and bolt $e^g$. Said oscillating plate is provided with two horizontally-projecting bearings $e^n$ $e^o$, in which is journaled the downwardly-projecting pin or spindle $f$ of a rectangular frame F, upon which is supported a back plate or rest G to receive the paper or cardboard upon which the tracing is to be made and in which is pivoted a vertically-oscillating box H, containing certain reducing-gear and guiding the arms which carry the tracing-pencil and the traveler by means of which the outlines of the figure are followed. The back plate or chart-rest G is provided with horizontally-projecting arms or plates $g$ $g'$, (see Figs. 13, 14, 17, 20, and 21,) which are pivoted, respectively, to the top and bottom of the rectangular frame by means of screws $f'$ $f^2$ and which have tongues $g^2$ $g^3$, for which sockets $f^3$ $f^4$ are provided upon the rectangular frame. The ends of the tongues are perforated, and vertically-sliding latches $f^5$ $f^6$ are guided in the rectangular frame to enter the perforations in the tongues and lock the latter in place. Springs $f^7$ $f^8$ tend to hold the latches in their locked position. The chart-rest G is provided at the top and bottom with cross-bars $g^4$ $g^4$, bearing end plates $g^5$, pivoted to the rest by means of screws $g^6$, so as to swing toward or away from the back plate of the rest. Stationary undercut bars $g^7$ are provided upon the plate beyond the swinging bars, beneath and between which the record-card is slipped. The swinging bars are then brought down upon the card and clamped tightly against the latter by means of swinging hooks $g^8$, pivoted to the back plate at $g^9$. Upon the back of the plate is supported a spirit-level $g^a$, by means of which the plate may be leveled up and in that manner brought into a position parallel with the vertical line passing through the center of gravity of the figure.

The box H is pivoted in the frame F by means of opposite pivot-screws $h$ $h'$, adjustable toward or from each other by means of a threaded connection with the frame and secured in place by jam-nuts $h^2$ $h^3$. The pivot-screws do not bear upon the box itself, but upon a framework H' within the box and secured thereto, which supports an ordinarily vertical axle I, carrying a horizontal gear I', and just above the same a horizontal pinion I². In the ends of the box will be seen rectangular openings, within and above and below which at both ends are antifriction-rollers J, journaled in brackets J', supported from the frame. Between these rollers are guided two longitudinally-moving bars K L, bearing racks $k$ $l$, engaging, respectively, with the gear I' and the pinion I². This gearing gives to the two bars a fixed differential movement, depending upon the relative sizes of the gear and the pinion.

Upon the outer end of the rod L is a pencil-holder M, (see Figs. 15, 16, 23, 24, and 25,) consisting of a barrel or tube $m$, secured to the bar, a longitudinally-moving pencil-clamp $m'$ within the same, and devices for yieldingly pressing the pencil toward the point and for drawing it in the opposite direction. The barrel $m$ is slotted at $m^2$ to receive a pin or screw $m^3$, projecting from the pencil-clamp sufficiently to engage a spring $m^4$ within the bar. The pencil-clamp $m'$ is slit at the point and the slit portion bent inward to hold the pencil in the usual manner. The opposite end of the clamp bears a lug $m^5$, and a collar $m^6$, journaled upon the barrel, is provided with an inner cam-surface $m^7$ to bear upon the lug to withdraw the pencil from the pointed end. The collar is preferably made large enough to furnish a convenient grip and knurled upon its periphery to enable it to be readily turned by the hand. In the pencil-holder is supported a pencil N, the point of which is intended to trace upon a reduced scale the path of the traveler upon the end of the rod K. The horizontal reduction is accomplished by the differential gearing above described and the vertical reduction by the difference in length between the two bars K L.

The arm K has its end opposite the box H offset to enable the middle of an arc-shaped traveler O (see Figs. 26 and 27) to be placed in line with the pencil N. The end of the arm K carries a horizontal post $o$ at right angles to the arm, bearing at its base a gear $o'$, and carrying beyond the same a pivoted frame $o^2$, in which is journaled a rod $o^3$, extending beyond the frame in the form of an arc drawn from the vertical pivot $f$ of the frame F. A series of rollers $o^4$ are journaled upon this arc-shaped extension to travel upon the person. The rod also carries a gear $o^5$, corresponding in size to the gear $o'$ and in mesh with the latter, the object of which is to rotate the traveler once about the rod $o^3$ whenever it is rotated about the post $o$. The rollers $o^4$ are made of such diameter as to bring their peripheries into the line of the post $o$, and the operation of the gearing is to present the convex side of the traveler to the person in the line of the post when the frame is swung parallel with the rod K and toward the chart and to present the concave side of the traveler in the same line when the frame is swung one hundred and eighty degrees therefrom. This is clearly shown in Fig. 26. A handle $o^6$ is provided upon the frame by means of which the traveler may be conveniently supported.

In the use of the apparatus the person to be measured is placed upon the platform C and the ratchet devices operated until the platform assumes the position to which gravity tends to bring it. Then the various supporting devices are adjusted to the parts of the figure which they are intended to support to keep the same in one position during the operation of the device. Assuming that the chart rest or holder has been previously leveled up, the traveler is next brought to the mark x on the frame and the chart slipped laterally until the center line of the chart is beneath the pencil-point. The traveler is then passed over the parts of the figure which it is desirable to lay out upon the chart, and in so doing the pencil traces an accurate reduced outline of the path of the traveler. When the operation is completed, with the person to be measured in one position, said person is preferably turned at right angles to the first position, the ratchet devices again operated until the platform swings at equilibrium, and the supporting devices again adjusted. The traveler is then brought back to the mark X on the frame, a new chart slipped into the holder until the center line reaches the pencil-point, and the traveler is again passed over the parts of the figure presented to it in the new position. This causes the pencil to trace a reduced outline of the person at right angles to that obtained by the first operation.

The apparatus involves a large number of details of construction, all of which have been described in their preferred form, but in the case of many of which the said exact form is immaterial and capable of great variation without departing from the invention. Likewise the arrangement and the various combinations of the parts are in certain instances immaterial to the invention, broadly considered.

I claim as new and desire to secure by Letters Patent—

1. In an apparatus of the class described, the combination with devices for automatically bringing the center of gravity of an object into a fixed plane, of a traveler adapted to pass over the surface of the object, a chart-supporting device arranged in a given position relative to said plane, a marking device adapted to travel over the surface of said supporting device and connecting devices between the traveler and the marking device adapted to cause the marking device to record the movements of the traveler to a given scale; substantially as described.

2. In an apparatus of the class described, the combination with a suitable framework, traveler and recording device provided with suitable connecting devices, of a positioning device, consisting of a platform swung from two points, one of which is sufficiently above the platform to cause the latter to bring the center of gravity of the person into the vertical plane of said point, whereby the perpendicular line through the center of gravity of the person may be brought into a predetermined relation to the recording device; substantially as described.

3. In an apparatus of the class described, the combination with a platform swung within the same, of an escapement device engaging the platform and adapted by its operation to permit a step-by-step movement of the platform toward equilibrium; substantially as described.

4. In an apparatus of the class described, the combination with a suitable frame, of a swinging platform hung therein, a series of adjustable rests, and devices whereby they may be brought into contact with the figure after the same has been brought into position by the platform; substantially as described.

5. The combination with a suitable supporting-frame, of an adjustable rest supported by two diverging rods pivoted to the rest, and clamps for said rods carried by the frame, the rods being pivotally secured and longitudinally adjustable in the clamps; substantially as described.

6. In an apparatus of the class described, the combination with a vertically-pivoted recording device, of an arm extending therefrom and a traveler supported upon the end of the arm in the form of the arc of a circle drawn from the pivot; substantially as described.

7. In a device of the class described, the combination with a vertically-pivoted recording device of an arm extending therefrom and a traveler upon the end of the arm formed in the arc of a circle about the pivot, said traveler being provided with devices for moving it longitudinally of the arm, to the extent of its own width without reversing its curvature relative to the pivot; substantially as described.

8. In a device of the class described, the combination with a suitable chart-holder, of a vertically-pivoted frame carrying the same, a horizontally-pivoted support in the frame, a pair of longitudinally-movable parallel arms guided in said support, gearing connected to two to give them a differential movement, a marking device upon the end of one and a traveler upon the end of the other; substantially as described.

9. In a device of the class described, the combination with suitable positioning devices for the figure, of a vertically-pivoted recording device and universal adjusting devices for bringing the pivot of said recording device into the desired relation to the frame; substantially as described.

10. The combination with a pivoted frame, bearing a chart-holder, of a support pivoted thereto at right angles to the pivot of the frame, a pair of arms longitudinally guided in the support, gearing connecting the arms to give them a differential movement, a pencil upon one arm adapted to pass over the surface of the chart-holder and a traveler upon the other arm adapted to pass over the surface of a given figure; substantially as described.

11. In a device of the class described, the combination with a vertically-pivoted frame, of a chart-holder vertically hinged thereto and provided with a suitable latch for securing it in position, a horizontally-pivoted support in the frame, a pair of differentially-moving and longitudinally-guided arms carried in said support parallel to the chart-holder, pencil-carrying devices upon one of said arms in front of the chart-holder and a traveler upon the other adapted to pass over the surface of a given object; substantially as described.

In witness whereof I have hereunto set my hand at Chicago, in the county of Cook and State of Illinois, this 5th day of October, A. D. 1899.

CHARLES HAZOR SMITH.

Witnesses:
CHAS. O. SHERVEY,
S. BLISS.